United States Patent

[11] 3,600,670

[72] Inventors Donald A. Senour
Carlisle;
Fred J. Lingel, Lynnfield, both of, Mass.
[21] Appl. No. 881,998
[22] Filed Dec. 4, 1969
[45] Patented Aug. 17, 1971
[73] Assignee BLH Electronics, Inc.
Waltham, Mass.

[54] ELECTRICAL BRIDGE SYSTEM WITH LEAKAGE-RESISTANCE PROTECTION
4 Claims, 6 Drawing Figs.
[52] U.S. Cl. .................................................... 323/75 D,
323/75 N, 339/14 R
[51] Int. Cl. .................................................... H01r 3/06,
G01r 17/10
[50] Field of Search .......................................... 323/75 D,
75 N; 339/14 R

[56] References Cited
UNITED STATES PATENTS
1,672,067  6/1928  Labre ............................ 339/14 R
1,967,091  7/1934  Kempton ....................... 339/14 R
2,531,145  11/1950  Marco et al. .................. 323/75 N Primary Examiner—William H. Beha, Jr.
Assistant Examiner—A. D. Pellinen
Attorney—Thomson, Mrose & Ericson ABSTRACT: The effects of leakage resistance in a precision measuring system are minimized by providing a guard strip for shielding the power input terminals from the low-level signal output terminals in an electrical connector, by grounding the center tap of the secondary of the power input transformer, and by both twisting and shielding the pairs of power input leads and signal output leads.

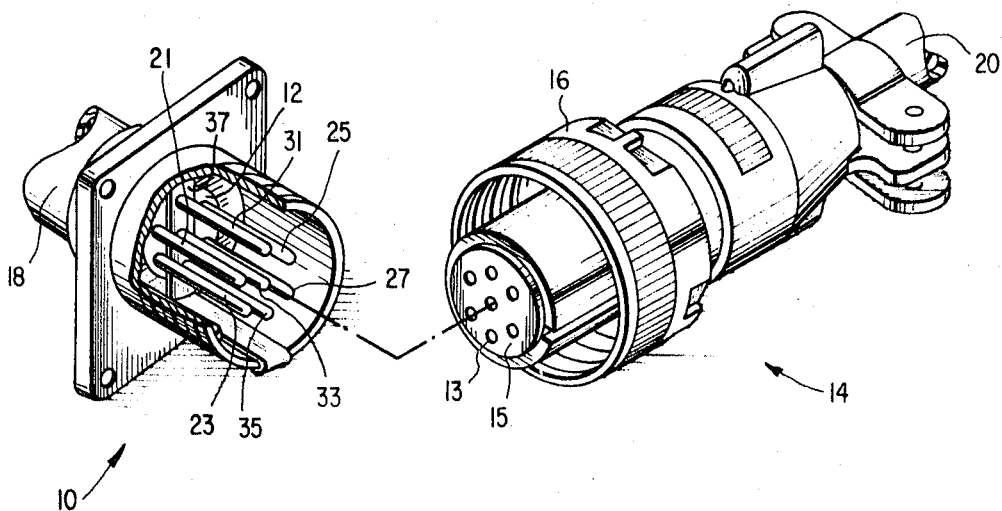
FIG. 1
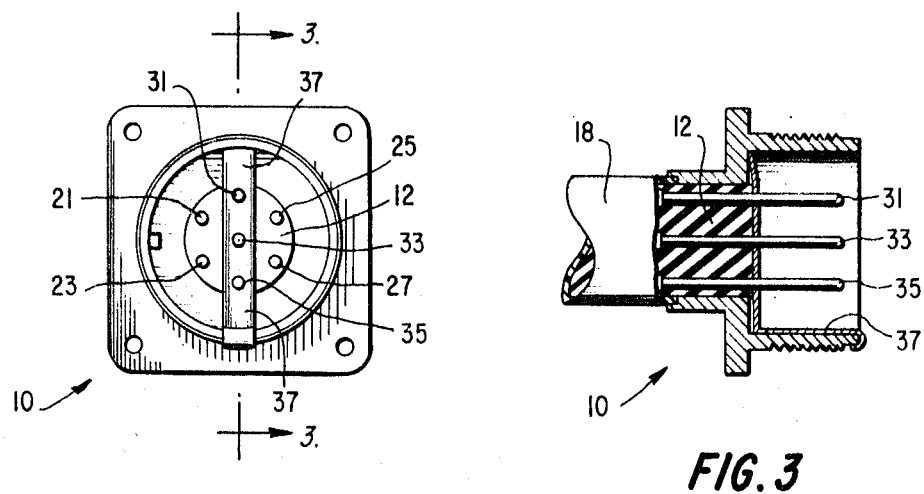
FIG. 2
FIG. 3
INVENTOR
DONALD A. SENOUR
FRED J. LINGEL
BY Thomson, Mrose & Ericson
ATTORNEYS

INVENTOR
DONALD A. SENOUR
FRED J. LINGEL

BY Thomson, Moore & Ericson
ATTORNEYS

ELECTRICAL BRIDGE SYSTEM WITH LEAKAGE-RESISTANCE PROTECTION

BACKGROUND OF THE INVENTION

The present invention relates to the minimization of the effects of leakage resistance in precision measuring systems, and, in one particular aspect, to a unique apparatus for minimizing the effects of leakage resistance in precision measuring systems by providing a unique guard strip for shielding the power input terminals from the low-level signal output terminals in an electrical connector, by grounding the center tap on the secondary of the power input transformer, and by both twisting and shielding the pairs of power input leads and signal output leads.

A problem that has existed in systems for providing precision measurements, such, for example, as in strain gage weighing systems, is that under certain environmental conditions leakage resistance in the system's cables and connectors, generally between the strain gage responsive elements and the measuring instruments, occurs. In particular, during heavy rainstorms or on humid days, water and moisture get into the system cables and connectors and cause leakage resistance from wire-to-wire and terminal-to-terminal. Moreover, often the system cables and connectors are dragged along the ground at an airport or toll booth weighing station where oil and dirt tend to seep therein and cause additional leakage resistance to occur. The effects of such leakage resistance has been to cause measurement errors sometimes as high as fifty percent of the true reading. It has been found that the greatest leakage resistance occurs and hence causes the greatest error in precision measurement between the power input terminals and the signal output terminals.

In the past, the effects of leakage resistance have been minimized primarily by brute force techniques alone. For example, a separate connector would be used for the power input terminals and the signal output terminals such that the two would be isolated and shielded from each other. The necessity of using two separate connectors for the power input terminals and the signal output terminals was both expensive and occupied a large amount of space.

One other manner of reducing the effects of leakage resistance in the past was to space the power input pins and the signal output pins a large distance apart whereby a long path would be needed for current to leak from one pin terminal to another. Such configurations were also found to be both extremely expensive and to take up a large amount of space.

Still other brute force attempts at reducing the effects of leakage resistance has been by merely providing better cabling and using more effective sealing techniques.

SUMMARY OF THE INVENTION

Accordingly, it is one of the objects of the present invention to provide unique apparatus for minimizing the effects of leakage resistance in precision measuring systems.

Another object of the subject invention is to provide new and improved apparatus for minimizing the effects of leakage resistance in precision measuring systems by providing a connector such that the power input terminals are isolated from the signal output terminals.

Further, it is an object of the present invention to provide unique apparatus wherein the system power input leads and signal output leads are each twisted and shielded such that the leakage resistance therebetween is minimized.

Still further, it is an object of the subject invention to provide novel and advantageous minimized leakage resistance by grounding the center tap of the secondary of the power input transformer.

One other object of the instant invention is the provision of a unique apparatus for minimizing the effects of leakage resistance on precision measurements in a strain gage responsive weighing system.

By way of a summary account of the practice of this invention in one of its aspects, the power input terminals are isolated from the signal output terminals in an electrical connector by the insertion of a metal guard strip therebetween, by twisting and shielding the power input leads and the signal output leads which are connected to the connector terminals and by further grounding the center tap of the secondary of the power input transformer.

BRIEF DESCRIPTION OF THE DRAWINGS

Although the features of this invention which are considered to be novel are expressed in the appended claims, further details as to preferred practices and as to the preferred objects and features thereof may be most readily comprehended through reference to the following description when taken in connection with the accompanying drawings, wherein:

FIG. 1 is an exploded perspective view of an electrical connector for interconnecting cables according to the present invention;

FIG. 2 shows an end plan view of one manner of isolating the power input pins from the signal output pins in an electrical connector according to the present invention;

FIG. 3 is a partial sectional view taken along the line 3–3 of FIG. 2;

DETAILED DESCRIPTION OF THE PREFERRED EMBODIMENTS

Figure 4:
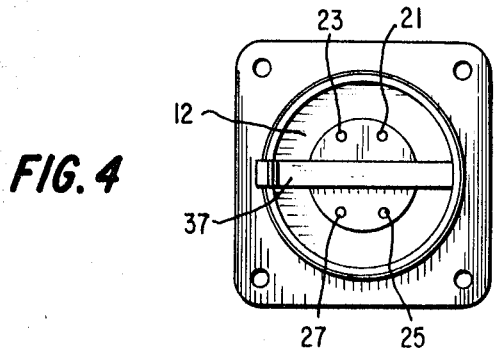
FIG. 4 shows an end plan view of an alternative manner of isolating the power input pins from the signal output pins in an electrical connector according to the present invention.

Referring now to the drawings, wherein like reference numerals designate identical or corresponding parts throughout the several views, and more particularly, to FIG. 1 thereof, wherein an electrical connector for interconnecting cables according to the present invention is shown as including a threaded male portion 10 having a plurality of terminal connecting pins, such, for example, as pin 25, disposed upon an insulating base surface 12 and a matching female portion 14 having a plurality of apertures, such, for example, as aperture 13, disposed upon an insulating base 15. The pins and apertures of the respective male portion 10 and female portion 14 are aligned so that they may be interconnected so as to provide a continuous electrical connection. The connection is sealed from external influences by a threaded sleeve 16 which fits over the threaded section of the male portion 10. The leads to the pin and aperture connections are shielded by insulating tubes 18 and 20, which may be of a rubber material or the like.

Referring now to FIG. 2, an end plan view of the male portion 10 of the connector shown in FIG. 1 is seen as including a pair of power input pins 21 and 23 and a pair of signal output pins 25 and 27. Additionally, a plurality of ground terminal pins 31, 33 and 35 intermediate the power input pins 21 and 23 and the signal output pins 25 and 27 are provided. In a particular application, the power input terminal pins 21 and 23 are for connecting a power source, such, for example, as a source of 10 volts at 400 Hz. frequency, to a pair of joining arms of an electrical bridge circuit arrangement including strain gage elements for precision weighing measurements. The signal output terminals 25 and 27 are connected to the other pair of joining arms in the electrical bridge circuit arrangement and will indicate the desired precision measurement. Under adverse weather conditions such as high humidity or rain, or due to other adverse surroundings, such as dirt, leakage resistance normally develops between the high-power input pins 21 and 23 and the low-level signal output pins 25 and 27. For example, in a system with signal output voltages of 0—3 millivolts, the effective resistance from the power input pins 21 and 23 and the signal output pin 25 and 27 to the ground terminal pins 31, 33 or 35 is about 300 ohms. From the power input pins 21 and 23 to the signal output pins 25 and 27 the effective leakage resistance was found to be about 0.2— 2.0 megohms. This would cause an unbearable error on the true value reading of from 0.4—4 millivolts. It has been found that the effects of such leakage resistance can be minimized by the provision of a metal guard strip 37, such, for example, as made of heavy gold-plated brass, between the power input pins 21 and 23, and the signal output pins 25 and 27. The guard strip 37 will force any leakage current and hence resistance effects that ordinarily would go from the power input pins 21 and 23 to the signal output pins 25 and 27 to go to ground. As shown in the partial sectional view of FIG. 3, the guard strip 37 in one arrangement may be force fitted over the ground pins 31, 33 and 35 and mounted flush against the insulating base surface 12. The guard strip 37 need be added only on the pin connector male portion 10, since the surface of the female portion 14 of the connector will be automatically protected when the connectors are plugged together. This is because the metal guard strip 37 will be clamped between the two sections of the connectors at the insulating base surfaces 12 and 15. It should be understood that the insulating base surfaces 12 and 15 may be of any suitable material, such, for example, as of rubber or glass. It should also be understood that while the metal guard strip 37 has been shown in FIGS. 2 and 3 as being fitted over the ground pins 31, 33 and 35, that the invention is not so limited and that the metal guard strip 37 may be mounted flush against the insulating base surface 12 without the need for ground pins as shown in FIG. 4.

Figure 5:
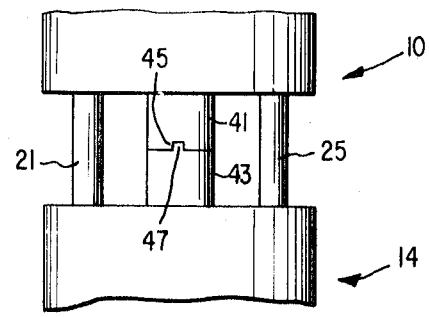
FIG. 5 is a side view of an alternative guard strip arrangement for use in isolating the power input pins from the signal output pins in an electrical connector according to the present invention; and, FIG. 6 shows in schematic form a strain gage weighing system incorporating the principles according to the present invention for minimizing the effects of leakage resistance.

Referring now to FIG. 5, the metal guard strip instead of being press fitted between the insulating base surfaces 12 and 15, respectively, of the male connector portion 10 and the female connector 14, is shown as consisting of two separate and interconnecting sections 41 and 43. The section 41 may be mounted flush against the insulating base portion 12 of the male portion 10. Additionally, the section 41 is shown as having an aperture 45 therein, such as a dowel. The section 43 may be mounted flush against the insulating base surface 15 of the female portion 14. The section 43 is shown as having a post 47 which interfits with the aperture 45 to provide a rigid connection.

Figure 6:
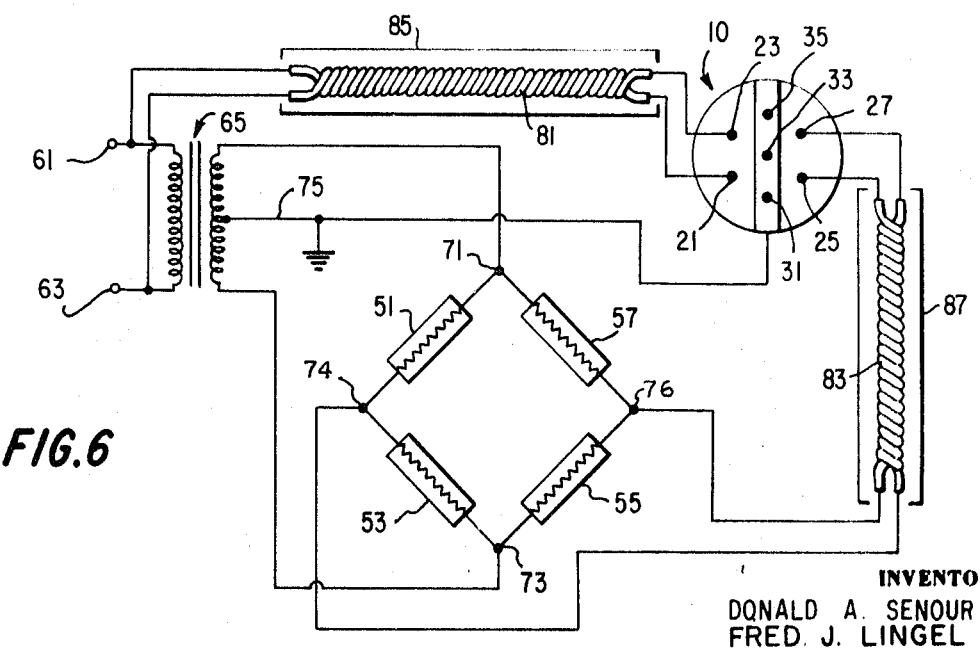

Referring now to FIG. 6, there is schematically shown a strain gage precision measuring arrangement which includes the electrical connector as described above, as well as still other ways for reducing the effects of leakage resistance in the making of accurate measurements. In particular, a conventional AC-excited wheatstone bridge circuit arrangement is provided and includes four electrical strain gage responsive elements 51, 53, 55 and 57, initially in a balanced condition. The power input signal is applied to the primary winding terminals 61 and 63 of an AC coupling transformer 65 through a connector of the type described above with reference to FIG. 2. It should be understood that only the male portion of the connector has been shown in the drawing and that similar connections are made to the female portion 14 to provide a continuous electrical path with the male portion. The output from the transformer secondary winding is applied as an input to the wheatstone bridge at the joining arm points 71 and 73. It has been found that by grounding the center tap 75 of the secondary of the power input transformer 65 by connecting the same to one of the ground terminals of the connector 10, such, for example, as terminal 31, that the effects of leakage resistance in the measurement system are still further reduced. This is because any leakage currents developed are again forced to ground, as opposed to power-to-signal or terminal-to-terminal. It should also be understood that the effects of leakage resistance can be substantially minimized in a bridge circuit arrangement by grounding the center of the power source, irrespective of any cable shielding, guard strips between power input and output pins and the like.

Furthermore, it should be understood that the ground for the center tap of the transformer 65 could be made external to the circuit shown in FIG. 6, such, for example, as at the readout indicator instrument.

The low-level output signal from the bridge circuit arrangement is taken across joining arm points 74 and 76 and is connected to terminals 25 and 27 of the connector 10. It should be understood that the female portion 14 of the connector will provide the necessary pins for connecting the low-level output signal to an indicating instrument whereby a reading can be obtained. It has also been found that if the high-power input leads and the low-level output leads going to and from the connector 10 are separately twisted at 81 and 83 and shielded at 85 and 87 from each other as shown in the figure, that the effects of any leakage resistance therebetween is still further reduced.

Now, understanding that the strain gage elements 51, 53, 55 and 57 are suitably connected to a weighing platform or the axles of a vehicle, the system output will indicate with precision the desired measurement.

It should now be apparent that the apparatus of the herein-described invention allows for precision measurement with minimized errors due to the effects of leakage resistance by the provision of an electrical connector having a guard strip for shielding the power input terminals from the signal output terminals thereof, by grounding the center tap on the secondary of the power input transformer, and by both twisting and shielding the pairs of power input leads and signal output leads. It should be further understood that while the invention has been described with particular reference to weighing in a strain gage bridge arrangement that the invention is not so limited and may apply to any bridge arrangement wherein the effects of leakage resistance are desired to be minimized.

Obviously, numerous modifications and variations of the present invention are possible in light of the above teachings. For example, while the guard strip has been shown as positioned between the power input pins and the signal output pins to isolate one from the other, a guard strip may equally be designed to encircle one set of pins to obtain a similar isolation. While the present invention has been shown with an AC power input, it should be understood that a DC power input could equally be used in light of the above teachings. In addition, the subject invention is applicable to interconnections other than in a connector, such, for example, in shielding the power input from the signal output in a terminal strip. It is therefore to be understood that within the scope of the appended claims, the invention may be practiced otherwise than as specifically described therein.

What we claim as new and desire to be secured by letters patent of the United States is:

1. Apparatus for minimizing the effects of leakage resistance comprising an electrical bridge circuit arrangement having a first pair of joining arm points and a second pair of joining arm points, interconnecting means connecting power input to said first pair of joining arm points and connecting signal output from across said second pair of joining arm points, said interconnecting means comprising a separable electrical connector which includes a male portion and a female portion each having an insulating base surface, first and second groups of pin connections disposed on the insulating base surface of said male portion for respectively connecting said power input and said signal output to and from said first and second pair of joining arm points, said groups of pin connections being disposed in alignment with and for interconnection respectively with first and second groups of aperture connections in the insulating base surface of said female portion, and means shielding said second group of pin connections from said first group of pin connections at the site of said insulating base surfaces, said shielding means comprising a grounded conductive metal guard extending between said first and second groups of pin connections at the site of at least one of said insulating base surfaces, whereby the effects of leakage resistance between said groups of pin connections are minimized.

2. Apparatus for minimizing the effects of leakage resistance as in claim 1, wherein arms of said electrical bridge circuit arrangement include electrical strain gage elements therein, and wherein said interconnecting means connecting power input to said first pair of joining arm points includes a center-tapped transformer, the center tap of a secondary winding of the transformer being grounded at the same ground potential as said metal guard, and the said power input being AC power applied to a primary winding of said transformer and coupled with said first pair of joining arm points from across said secondary winding, whereby the output of said electrical bridge circuit arrangement is a precision measurement with minimized error due to the effects of leakage resistance.

3. Apparatus for minimizing the effects of leakage resistance as in claim 2, wherein said AC input power appears at said first groups of pin connections and aperture connections, wherein said input power is applied to said primary winding from said first groups of pin connections and aperture connections and is applied to said first pair of joining arm points of said bridge circuit arrangement from across said secondary winding, and wherein said output from said second pair of joining arm points is applied to said second groups of pin connections and aperture connections.

4. Apparatus for minimizing the effects of leakage resistance as in claim 3, wherein said input power is applied to said primary winding from said first groups through a pair of twisted and shielded leads and said output is applied to said second groups through a pair of twisted and shielded leads, wherein said groups comprise pairs, and wherein said metal guard is a strip extending continuously between the first and second pairs of pins.